United States Patent
Föhl

[11] Patent Number: 5,374,080
[45] Date of Patent: Dec. 20, 1994

[54] SAFETY BELT PRETENSIONER FOR SAFETY BELT SYSTEMS IN VEHICLES

[75] Inventor: Artur Föhl, Schorndorf, Germany

[73] Assignee: TRW Repa GmbH, Alfdorf, Germany

[21] Appl. No.: 868,025

[22] Filed: Apr. 13, 1992

[30] Foreign Application Priority Data

May 24, 1991 [EP] European Pat. Off. ........ 91108468.9

[51] Int. Cl.$^5$ ............................................. B60R 22/36
[52] U.S. Cl. .................................... 280/734; 280/806
[58] Field of Search ................ 180/282; 280/806, 808, 280/734; 297/474, 480; 242/106

[56] References Cited

U.S. PATENT DOCUMENTS

| | | | |
|---|---|---|---|
| 4,703,950 | 11/1987 | Pickett | 280/806 |
| 4,757,954 | 7/1988 | Doty | 280/806 |
| 4,881,781 | 11/1989 | Borlinghaus et al. | 280/806 |
| 5,143,403 | 9/1992 | Fohl | 280/806 |
| 5,149,128 | 9/1992 | Fohl | 280/806 |
| 5,149,134 | 9/1992 | Fohl | 280/806 |

FOREIGN PATENT DOCUMENTS 0305765  8/1989  European Pat. Off. .
4027342  4/1991  Germany .

*Primary Examiner*—David M. Mitchell
*Assistant Examiner*—Stephen P. Avila
*Attorney, Agent, or Firm*—Tarolli, Sundheim & Covell

[57] ABSTRACT

In a belt pretensioner for safety belt systems in vehicles in which the belt buckle is disposed on a vehicle seat and the belt pretensioner engages said buckle, the problem is encountered that the vehicle-sensitive sensor mass mounted movably on the vehicle seat also responds to decelerations of the vehicle seat relatively to the vehicle bodywork. To prevent any erroneous activation caused thereby, the sensor mass is secured until occurrence of a first predetermined vehicle deceleration value which is lower than a second vehicle deceleration value at which the activation of the drive of the belt pretensioner by the movement of the sensor mass occurs. On the other hand, the securing of the sensor mass is cancelled on exceeding of the first vehicle deceleration value. The cancelling of the securing of the sensor mass is ensured by a separate deceleration sensor which is mounted directly on the vehicle bodywork, for example beneath the vehicle seat.

13 Claims, 3 Drawing Sheets

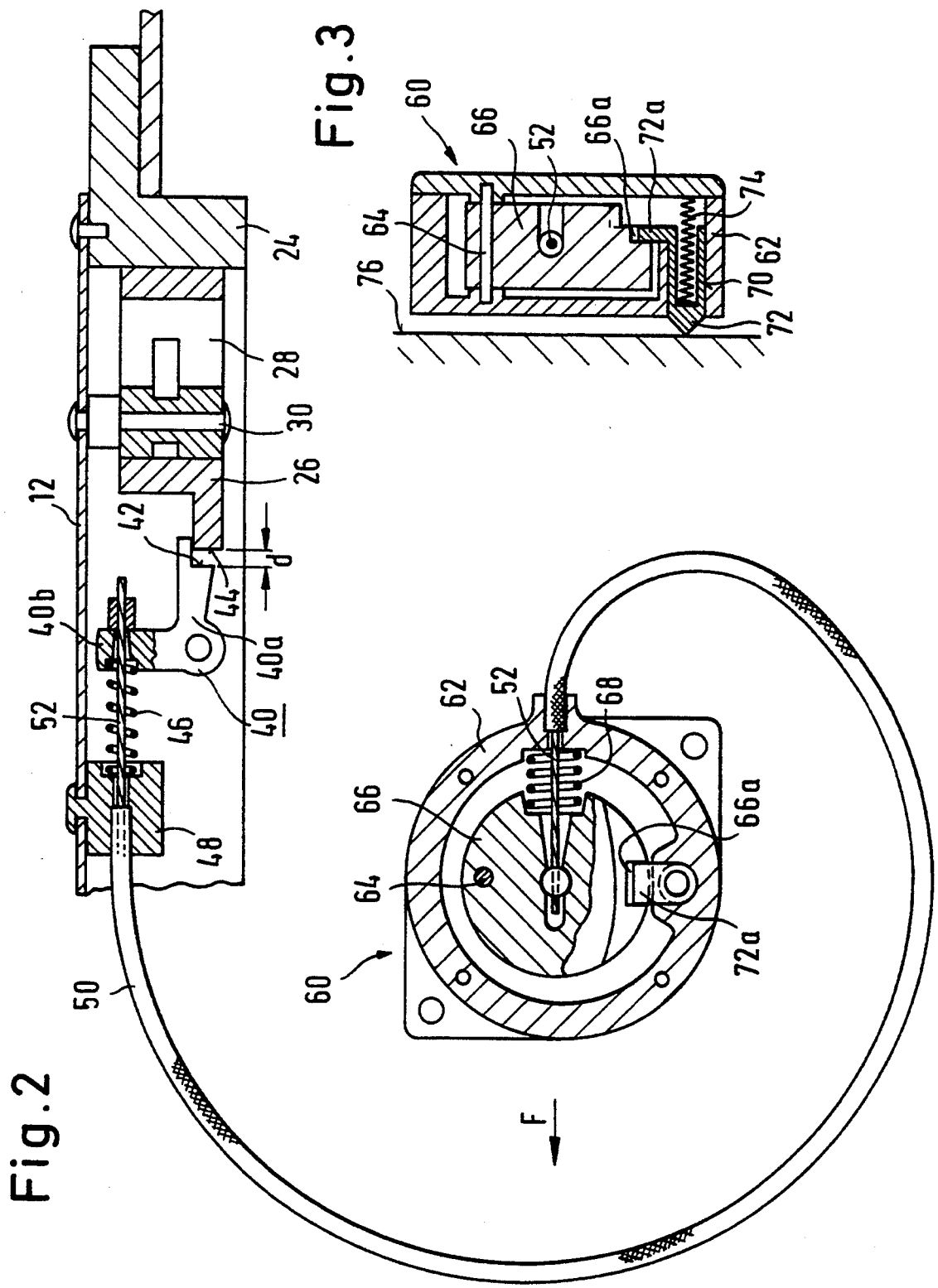

SAFETY BELT PRETENSIONER FOR SAFETY BELT SYSTEMS IN VEHICLES

BACKGROUND OF THE INVENTION

The invention relates to a safety belt pretensioner for safety belt systems in vehicles in which the belt buckle is arranged on a vehicle seat and the belt pretensioner engages said buckle, comprising a vehicle-sensitive sensor mass which is movably mounted on the vehicle seat and a drive activatable by the vehicle-sensitive movement thereof.

When attaching a belt pretensioner directly to a vehicle seat it is desirable to arrange the vehicle-sensitive trigger mechanism on the vehicle seat as well to avoid the necessity of complicated cabling between the vehicle bodywork and the vehicle seat displaceable relatively thereto. However, the sensor mass of the trigger mechanism is then subjected not only to the vehicle deceleration but also to decelerations which can occur on any seat adjustment. Under unfavourable conditions, for example sudden abrupt braking of the vehicle during execution of a seat adjustment, the forward movement of the seat in its guide rails being abruptly blocked at a detent, the trigger threshold of the vehicle-sensitive trigger mechanism may be exceeded and the belt tightening activated. The attempt to prevent activation of the belt pretensioner in such a case by blocking the sensor mass of the trigger mechanism whilst the grip for seat unlocking is actuated is not always successful because the abrupt deceleration at the vehicle seat can occur after the grip has been released again.

SUMMARY OF THE INVENTION

The invention provides a belt pretensioner which is secured against any erroneous activation by deceleration of the vehicle seat relatively to the vehicle bodywork and can only be activated when the vehicle deceleration exceeds a predetermined value.

This is achieved according to the invention in that the sensor mass is secured until occurrence of a first predetermined vehicle deceleration value which is lower than a second vehicle deceleration value at which the activation of the drive by the movement of the sensor mass takes place, and is unsecured when the first vehicle deceleration value is exceeded. Since the sensor mass is secured in the normal operating state of the vehicle and is not unsecured until, independently of any possible deceleration of the vehicle seat relatively to the vehicle bodywork, the vehicle deceleration exceeds a predetermined threshold value, erroneous activation of the belt pretensioner on seat adjustment is impossible. For unsecuring the sensor mass a deceleration sensor mounted on the vehicle bodywork is preferably employed and the sensor mass is arrested by a controllable locking means in its secured position. The deceleration sensor is in operative connection with the locking means to switch over the latter when the predetermined first vehicle deceleration value is exceeded and unlock the sensor mass. Said delay sensor, which preferably has a housing to be secured to the vehicle bodywork and a sensor mass movably mounted therein, responds only to decelerations of the vehicle bodywork. In the normal operating state of the vehicle the sensor mass on the belt pretensioner is secured by the locking means. On any seat adjustment it then remains secured even should extremely high deceleration values occur at the seat, and consequently also at the sensor mass of the belt pretensioner.

The operative connection between the locking means and the sensor mass of the deceleration sensor is preferably via a sheathed cable which operates very reliably even for long periods of time, is robust and keeps the production costs low.

BRIEF DESCRIPTION OF THE DRAWINGS

A preferred embodiment of the invention will now be described in detail with the aid of the drawings, wherein:

FIG. 2 is a schematic sectional view showing part of the belt pretensioner and the deceleration sensor connected thereto via a sheathed cable;

FIG. 3 is a radial section of the deceleration sensor shown in FIGS. 1 and 2.

DESCRIPTION OF PREFERRED EMBODIMENTS

Belt pretensioners which are secured to a vehicle seat and engage the buckle of a safety belt system are known. Consequently, the safety belt system and the vehicle parts on which the belt pretensioner is arranged will not be described.

Figure 1:
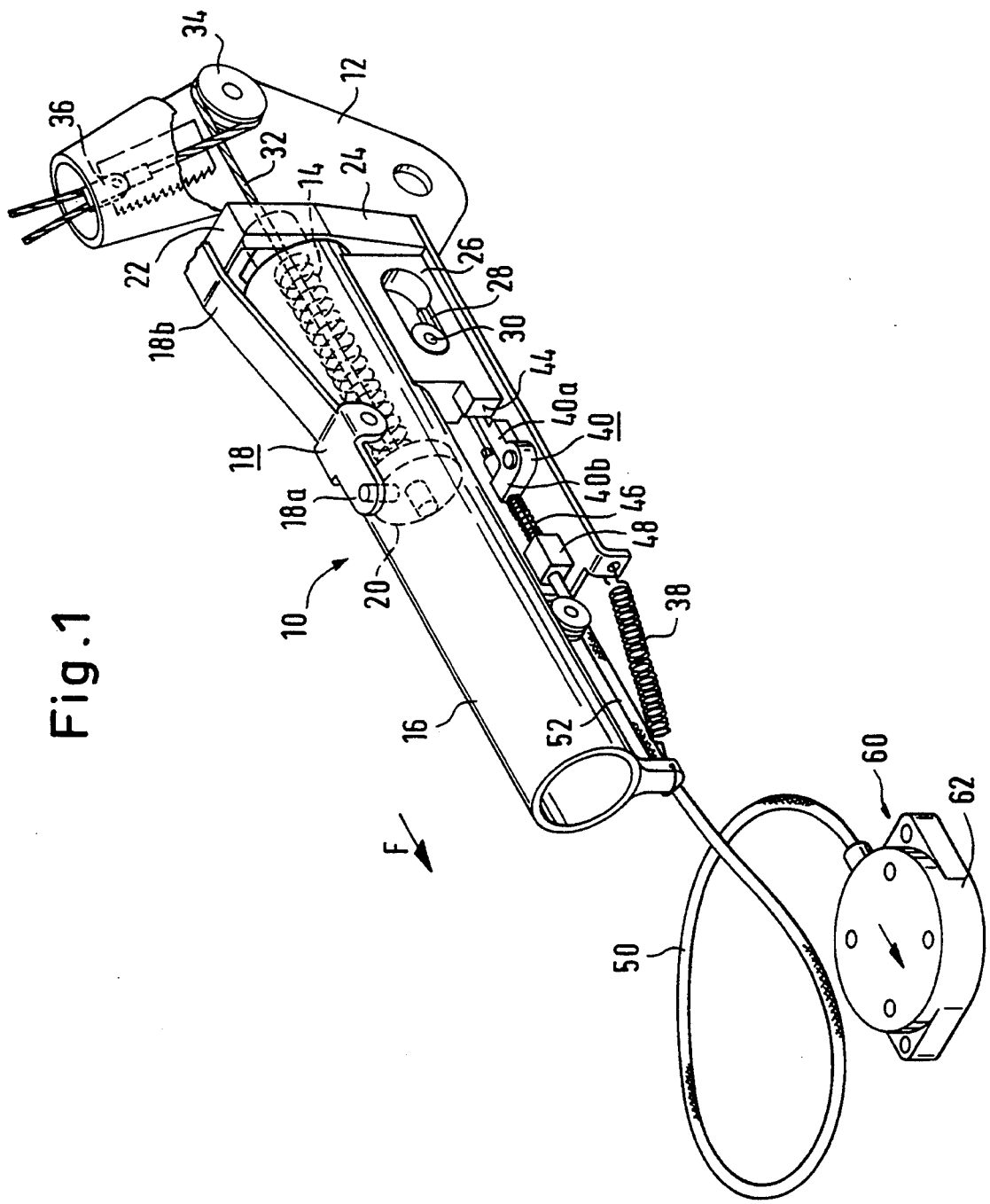
FIG. 1 is a schematic perspective view of a belt pretensioner to be mounted on a vehicle seat and a deceleration sensor which is connected to said pretensioner via a sheathed cable and is to be secured to the vehicle bodywork.

In FIG. 1 a socalled mechanical belt pretensioner is shown, the drive of which is derived from a pressure spring kept under tension. However, the principle underlying the invention is also applicable to belt pretensioners of other types, in particular those having a pyrotechnical drive.

The belt pretensioner denoted generally by 10 is built up on a mounting plate 12 which is secured to the vehicle seat (not illustrated). A tensioned pressure spring 14 is accommodated in a guide cylinder 16. The pressure spring 14 is kept in its tensioned state by a two-armed release lever 18 pivotally mounted on the guide cylinder 16. Said release lever 18 carries at the end of its first shorter lever arm 18a a blocking nose which projects through an opening in the wall of the guide cylinder 16 into the interior thereof and engages the end face of a piston 20 which is guided in the interior of the guide cylinder 16 and on which the one end of the tensioned pressure spring 14 bears, the other end of which bears on the bottom of the guide cylinder 16. The second longer arm 18b of the release lever 18 bears at its free end on an engagement surface 22 of a support member 24 fixedly connected to the mounting plate 12. A guide block 26 displaceably mounted on the mounting plate 12 is fixedly connected to the guide cylinder 16. Said guide block 26 comprises a slot 28 into which engages a guide pin 30 which is rigidly connected to the mounting plate 12 and has a pushed-on guide roller.

A pulling cable 32 anchored to the piston 20 is deflected through more than 180° by a deflection pulley 34 rotatably mounted on the mounting plate 12 and connected to a fitting 36 to which the buckle (not shown) of the safety belt system is connected.

Between the free end of the guide cylinder 16 and the adjacent end of the mounting plate 12 a tension spring 38 is attached. The guide cylinder 16 with all the parts mounted thereon and in particular the pressure spring 14 accommodated therein forms a vehicle-sensitive sensor mass of the belt pretensioner. Said mass is mounted linearly displaceably relatively to the mounting plate 12. The direction of the linear displacement of said sensor mass due to its mass inertia and following a vehicle deceleration coincides with the normal travelling direction which is denoted in FIG. 1 by an arrow F. This linear movement induced by the mass inertia of the sensor mass is opposed by the tension spring 38 which defines the trigger threshold of the belt pretensioner. When said threshold is reached, for example at a vehicle deceleration between 4 and 6 g, the free end of the second lever arm 18b of the release lever 18 has moved over the end edge of the engagement surface 22 so that the release lever biased by the pressure spring 14 with an opening moment becomes free and releases the piston 20 and the pressure spring 14. The pressure spring 14 now relaxes and via the pulling cable 32 and the buckle connected to the fitting 36 pulls the belt slack out of the safety belt system.

However, in the normal operating state of the vehicle the guide block 26 belonging to the sensor mass of the belt pretensioner is secured by a locking lever 40 pivotally mounted on the mounting plate 12. Said locking lever 40 is constructed as two-armed angled lever and comprises on its first arm 40a an arresting face 42 which lies opposite a stop face 44 at the adjacent end of the guide block 26 at a distance d away of a few millimeters. As apparent from FIG. 2, the lever arm 40a with its free end bears on a side face of the guide block 26, thereby defining the rest position of the locking lever 40. In this rest position the locking lever 40 is loaded by a pressure spring 46 which bears with its one end on the second lever arm 40b of the locking lever 40 and with its other end on a support block 48 which is fixedly connected to the mounting plate 12. Also bearing on said support block 48 is the outer sheath 50 of a sheathed cable, the inner pulling cable 52 of which is surrounded by the pressure spring 46 and engages the second lever arm 40b. Said sheathed cable 50, 52 establishes an operative connection between the locking means formed by the locking lever 40 and a deceleration sensor 60, which will now be described in detail.

Said deceleration sensor 60 consists essentially of a housing 62 to be mounted on the vehicle bodywork and a sensor mass 66 pivotally mounted therein on a pin 64. The outer sheath 50 of the sheathed cable is supported in a bore of the housing 62. The pulling cable 52 of said sheathed cable extends into the interior of the housing 62 and is connected to the sensor mass 66 substantially at the centre point thereof. By a pressure spring 68 supported between the inner side of the housing 62 and the sensor mass 66 the pulling cable 52 is kept tensioned and the rest position of the sensor mass 66 thus also defined. There is therefore no play in the sheathed cable 50, 52 and consequently any shortening of the pulling cable 52 relatively to the outer sheath 50 caused by deflection of the sheathed cable is automatically compensated.

A sensing pin 72 is displaceably mounted in an axial bore 70 of the housing 62. Said sensing pin 72 is subjected to the action of a pressure spring 74 in the sense such that its free end projects out of the housing 62 for as long as the latter is not screwed to an oppositely disposed mounting surface 76 of the vehicle bodywork. The sensing lever 72 is provided at its inner end with an arresting lug 72a which engages into a recess 66a of the sensor mass 66 for as long as the free end of the sensing pin 72 projects out of the housing 62. When the housing 62 has been mounted on the oppositely disposed mounting surface 76 of the vehicle bodywork however the arresting lug 72a is moved out of the recess 66a and releases the sensor mass 66.

The mode of operation of the belt pretensioner will now be described. In the normal operating state of the vehicle the belt pretensioner is secured by the locking lever 40. Its sensor mass, in particular the guide block 26 connected thereto, can move only until its stop face 44 meets the oppositely disposed arresting face 42 on the lever arm 40a of the locking lever 40. In this state the free end on the second lever arm 18b of the release lever 18 still bears on the engagement surface 22. Activation of the belt pretensioner is therefore not possible. Since the belt pretensioner is secured via the mounting plate 12 to a vehicle seat, its sensor mass is also subjected to decelerations which occur on seat adjustment relatively to the vehicle bodywork. However, such decelerations can never result in activation of the belt pretensioner.

Release of the securing of the belt pretensioner is possible only by the deceleration sensor 60. Since the latter is mounted on the vehicle bodywork, it responds only to vehicle decelerations. The deceleration sensor 60 is installed in the vehicle for example under the driver's seat so that the normal travelling direction (arrow F in FIGS. 1 and 2) corresponds to the direction in which a pivoting of the sensor mass 66 exerts a tension on the pulling cable 52. Said pulling tension is transmitted via the pulling cable 52 to the lever arm 40b of the locking lever 40 and effects a pivoting of said locking lever 40 anticlockwise in FIG. 1 so that its lever arm 40a is moved out of the path of the stop face 44 at the free end of the guide block 26. The locking lever 40 now no longer obstructs the movement of the sensor mass of the belt pretensioner and the latter is therefore no longer secured.

A condition that the sensor mass 66 can move in the housing 62 is however that the sensing pin 72 is completely pressed into the housing 62, i.e. the latter is mounted on the mounting surface 76 of the vehicle bodywork. Otherwise, as indicated schematically in FIG. 3, the sensor mass 66 is secured by the arresting lug 72a in the interior of the housing 62. The belt pretensioner is therefore secured until the assembly of the deceleration sensor 60 on the vehicle bodywork has been completed. Thus, a double securing of the belt pretensioner is achieved by means of the locking lever 40: one securing against activation on seat adjustment and one securing against activation by jolts during transport, handling and assembly of the belt pretensioner prior to the final installation of the deceleration sensor 60 on the vehicle bodywork.

Figure 4:
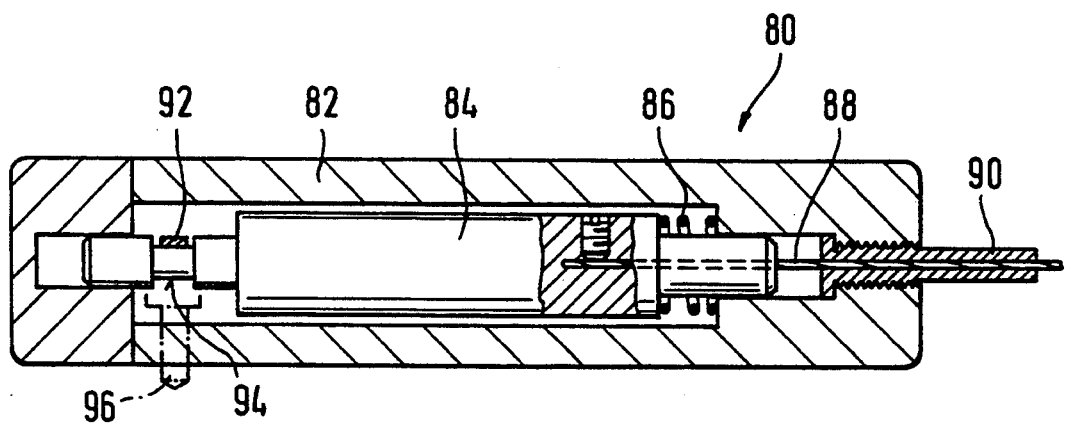
FIG. 4 is a section through a deceleration sensor of another embodiment.

In another embodiment of the deceleration sensor the sensor mass is not arranged pivotally but linearly displaceably. A deceleration sensor 80 shown in FIG. 4 includes an elongated housing 82 which is to be mounted on the vehicle and in which a sensor mass 84 is mounted slidably displaceably along the housing 82. A pressure spring 86 is supported between the inner side of the housing 82 and one end of the sensor mass 84 so that a pulling cable 88 of a sheathed cable 90 secured to the sensor mass 84 is tensioned. The pulling cable 90 leads to the belt pretensioner 10 according to FIG. 1. The deceleration sensor 80 is also equipped with a transport and assembly securing means. In the arrested state a leaf spring 92 secured to one end of the housing 84 engages into a receding groove 94 at the periphery of another end of the sensor mass 84. A sensing pin 96 projects unloaded out of the housing 82 and after assembly lifts the leaf spring 92 out of the groove 94 so that the sensor mass 84 is no longer secured.

The value of the vehicle deceleration at which the unsecuring of the belt pretensioner takes place is made considerably less than that of the deceleration value at which activation of the belt pretensioner is to take place. Depending upon the vehicle type, the triggering threshold for the belt pretensioner is for example about 4 to 6 g; the vehicle deceleration at which unsecuring of the belt pretensioner takes place can then lie at about 2 to 3 g. The exact value is not critical; it need only be a safety additional amount greater than the maximum braking deceleration of the vehicle.

The threshold value at which the unsecuring of the belt pretensioner by the deceleration sensor 60 takes place is governed mainly by the dimensioning of the pressure spring 46. This is opposed however by the pressure spring 68, which can be made of considerably weaker dimensions.

The belt pretensioner described is secured against any sort of erroneous activation by very simple means.

I claim:

1. A safety belt pretensioner for safety belt systems in vehicles comprising a buckle arranged on a vehicle seat, said pretensioner engaging on said buckle, and further comprising a vehicle-sensitive sensor mass which is movably mounted on the vehicle seat and a pretensioner drive activatable by deceleration-induced movement of said vehicle-sensitive sensor mass, said sensor mass being held in a secured condition until occurrence of a first predetermined vehicle deceleration value which is lower than a second vehicle deceleration value at which activation of said drive by movement of said sensor mass takes place, and said sensor mass being released to an unsecured condition when the first vehicle deceleration value is exceeded.

2. The pretensioner according to claim 1, wherein for releasing said sensor mass to its unsecured condition a deceleration sensor secured to the vehicle bodywork is provided, said sensor mass being lockable in said secured condition by a controllable locking means, and said deceleration sensor being in operative connection with said locking means to release said sensor mass to said unsecured condition on exceeding the first vehicle deceleration value.

3. The pretensioner according to claim 2, wherein said deceleration sensor comprises a housing to be secured to the vehicle bodywork and a sensor mass mounted movably therein.

4. The pretensioner according to claim 1, wherein a locking lever is provided for holding the sensor mass of the pretensioner in said secured condition, said locking lever having a stop face for the sensor mass which until the first vehicle deceleration value is reached is disposed a distance away from an oppositely disposed stop face of the sensor mass.

5. The pretensioner according to claim 2, wherein said sensor mass of the deceleration sensor is pivotally mounted in the housing.

6. The pretensioner according to claim 2, wherein said sensor mass of the deceleration sensor is mounted linearly displaceably in the housing.

7. A safety belt pretensioner for safety belt systems in vehicles comprising a buckle arranged on a vehicle seat, said pretensioner engaging on said buckle, and comprising a vehicle-sensitive sensor mass which is movably mounted on the vehicle seat and a pretensioner drive activatable by deceleration-induced movement of said vehicle-sensitive sensor mass, said sensor mass being held in a secured condition until occurrence of a first predetermined vehicle deceleration value which is lower than a second vehicle deceleration value at which activation of said drive by movement of said sensor mass takes place, said sensor mass being released to an unsecured condition when the first vehicle deceleration value is exceeded, wherein for releasing said sensor mass to its unsecured condition a deceleration sensor secured to the vehicle bodywork is provided, said sensor mass being lockable in said secured condition by a controllable locking means, said deceleration sensor being in operative connection with said locking means to release said sensor mass to said unsecured condition on exceeding the first vehicle deceleration value, said deceleration sensor comprises a housing to be secured to the vehicle bodywork and a sensor mass mounted movably therein, said sensor mass of the deceleration sensor is in turn arrested in said housing by a mounting safety means until said housing is mounted on the vehicle bodywork.

8. The pretensioner according to claim 7, wherein said mounting safety means comprises a sensing element which is movably mounted on the housing and which on mounting of the housing comes to bear on the vehicle bodywork and actuates the mounting safety means to release the sensor mass of said deceleration sensor.

9. A safety belt pretensioner for safety belt systems in vehicles comprising a buckle arranged on a vehicle seat, said pretensioner engaging on said buckle, and comprising a vehicle-sensitive sensor mass which is movably mounted on the vehicle seat and a pretensioner drive activatable by deceleration-induced movement of said vehicle-sensitive sensor mass, said sensor mass being held in a secured condition until occurrence of a first predetermined vehicle deceleration value which is lower than a second vehicle deceleration value at which activation of said drive by movement of said sensor mass takes place, said sensor mass being released to an unsecured condition when the first vehicle deceleration value is exceeded, wherein for releasing said sensor mass to its unsecured condition a deceleration sensor secured to the vehicle bodywork is provided, said sensor mass being lockable in said secured condition by a controllable locking means, said deceleration sensor being in operative connection with said locking means to release said sensor mass to said unsecured condition on exceeding the first vehicle deceleration value, said deceleration sensor comprises a housing to be secured to the vehicle bodywork and a sensor mass mounted movably therein, said sensor mass of the deceleration sensor being connected via a sheathed cable to the locking means.

10. The pretensioner according to claim 9, wherein said sensor mass of the deceleration sensor is biased by a spring in a direction of the movement of the sensor mass on vehicle deceleration.

11. A safety belt pretensioner for safety belt systems in vehicles comprising a buckle arranged on a vehicle seat, said pretensioner engaging on said buckle, and comprising a vehicle-sensitive sensor mass which is movably mounted on the vehicle seat and a pretensioner drive activatable by deceleration-induced movement of said vehicle-sensitive sensor mass, said sensor mass being held in a secured condition until occurrence of a first predetermined vehicle deceleration value which is lower than a second vehicle deceleration value at which activation of said drive by movement of said sensor mass takes place, said sensor mass being released to an unsecured condition when the first vehicle deceleration value is exceeded, a locking lever being provided for holding the sensor mass of the pretensioner in said secured condition, said locking lever having a stop face for the sensor mass which until the first vehicle deceleration value is reached is disposed a distance away from an oppositely disposed stop face of the sensor mass, said locking lever being biased into its position holding said sensor mass by a spring force defining the first vehicle deceleration value.

12. A safety belt pretensioner for moving a vehicle safety belt arranged on a vehicle seat during a pretensioning stroke to remove slack from the safety belt, said pretensioner comprising:

vehicle-sensitive sensor mass means for moving from a rest position toward an activation position during a vehicle deceleration greater than an activation magnitude, said sensor mass means being movably mounted on the vehicle seat;

pretensioner drive means for providing a force to move the safety belt, said drive means being activated by movement of said sensor mass means to the activation position; and securing means for blocking movement of said sensor mass means to prevent movement to the activation position during a vehicle deceleration less than a threshold magnitude and for permitting movement of said sensor mass means to the activation position during a vehicle deceleration greater than the threshold magnitude, the threshold magnitude being less than the activation magnitude.

13. A safety belt pretensioner as set forth in claim 12, wherein said vehicle-sensitive mass means includes a first inertial mass, said first inertial mass is movable relative to the vehicle, said securing means includes a locking member, a second inertial mass and a connecting member, said locking member is movably mounted adjacent to said first inertial mass, said locking member has a rest position in which said locking member is located in a path of travel of said first inertial mass, said second inertial mass is movably mounted to a vehicle body member, the vehicle seat is adjustable relative to the vehicle body member, said second inertial mass moves from a rest position during a vehicle deceleration greater than the threshold magnitude, said connecting member connects the locking lever to the second inertial mass and moves said locking lever out of the path of travel of said first inertial mass when said second inertial mass moves during a vehicle deceleration.

* * * * *